INVENTOR
Dexter H. McMaster
BY
Barnard, McGlynn & Reising
ATTORNEYS

Sept. 17, 1968 D. H. McMASTER 3,402,036
METHOD AND APPARATUS FOR CONVEYING AND CURVING GLASS SHEET
MATERIAL ON A GAS SUPPORT BED
Filed Jan. 8, 1965 2 Sheets-Sheet 2
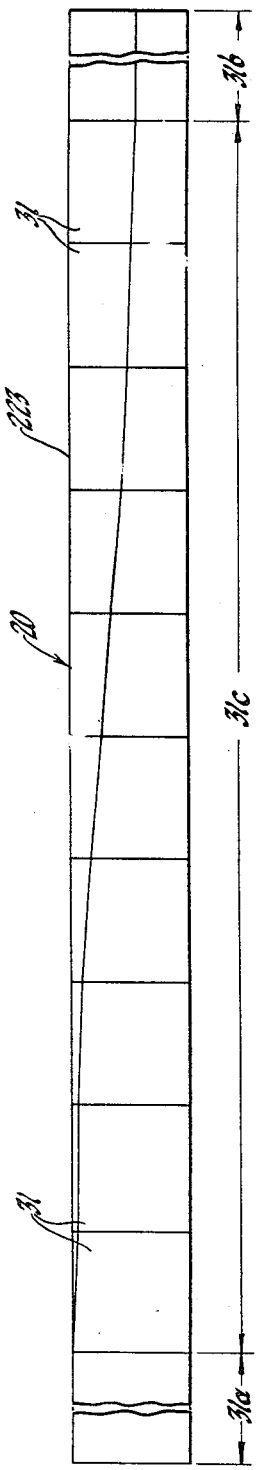
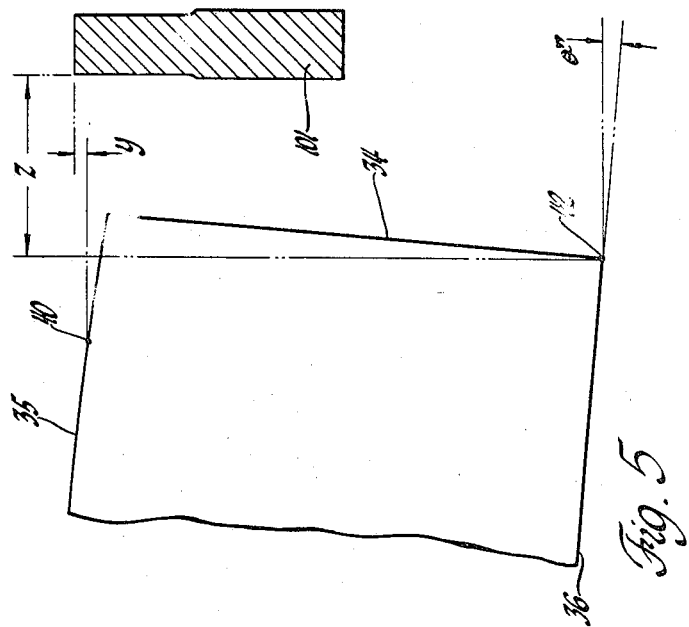
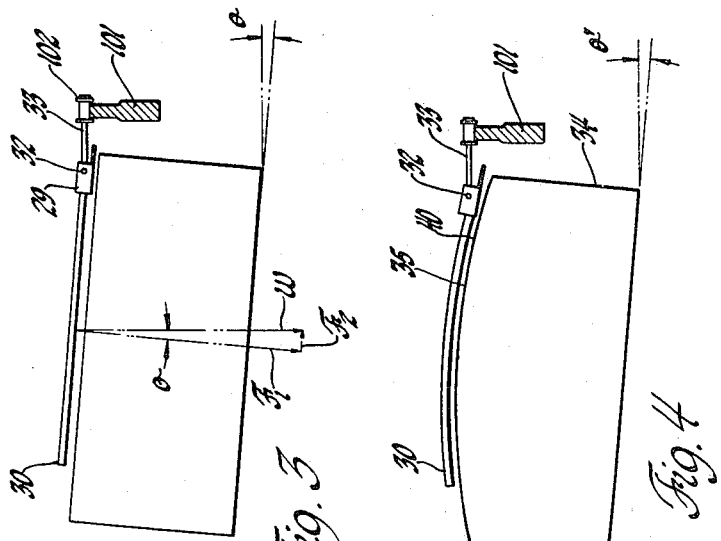
INVENTOR.
Dexter H. McMaster
BY
Barnard, McGlynn & Reising
ATTORNEYS

United States Patent Office 3,402,036
Patented Sept. 17, 1968

3,402,036
METHOD AND APPARATUS FOR CONVEYING AND CURVING GLASS SHEET MATERIAL ON A GAS SUPPORT BED
Dexter H. McMaster, Genoa, Ohio, assignor to Permaglass Inc., Woodville, Ohio, a corporation of Ohio
Filed Jan. 8, 1965, Ser. No. 424,331
6 Claims. (Cl. 65—25)

ABSTRACT OF THE DISCLOSURE

A method and apparatus for curving a sheet of thermoplastic material, such as glass, wherein a sheet of glass is floated on gas above a support bed which has a varying degree of transverse curvature therealong and is tilted so that an edge of the sheet of glass contacts a conveying means adjacent one longitudinal edge of the bed, and wherein the angle of tilt of the bed is varied therealong commensurately with the degree of transverse curvature to maintain the component of force, which is due to the weight of the sheet and which urges the sheet against the conveyor means, substantially constant.

---

In recent years, there has been a greatly increased demand for curved glass sheets or plates for use as automobile windows, protective windows for television screens, building windows, etc. At the same time, there has been ever increasing recognition of the advantages of tempered glass, particularly its high strength and safety features, and hence the current demand is for windows of tempered curved glass. To manufacture tempered glass it is necessary that the individual glass pieces first be cut and formed to a particular shape desired and then tempered. Hence, to manufacture curved tempered glass automobile windows, or the like, the essential sequence of steps is (1) form an untempered glass sheet to proper size, with edges rounded and polished as desired, (2) heat and bend the sheet to the curvature required, and (3) rapidly and uniformly cool the curved sheet to provide the temper.

In United States Patent 3,332,759 in the names of Harold A. McMaster and Norman C. Nitschke, there is disclosed and claimed an improved method and apparatus for manufacturing curved tempered glass sheets on a continuous basis. In accordance with that invention, the glass sheets to be curved and tempered are moved along an elongate perforated bed which extends through a heating furnace and then through a cooling blasthead, the bed being flat and then, in a transition zone thereof, gradually becomes transversely curved. The glass sheets are floated on the bed within the furnace by hot gases emitted from the perforations therein. Hence, by the time the glass sheets have reached the transition zone, they have been heated by the hot gases to deformation temperature such that they sag by gravity to conform to the curved surface of the bed. The hot curved glass sheets are then floated through a blasthead where they are cooled and supported by air at room temperature emitted from the portion of the bed within the blasthead. With such method and apparatus, excellent tempered curved glass sheets can be produced at a continuous high production rate and at a relatively low cost.

One of the more critical problems in a method of the type described in that of conveying of the sheets of glass along the perforated bed in such manner that they may freely sag due to gravity to conform to the contour of the bed. That is, the conveying means must be such that it imparts the necessary movement to the sheets along the bed while not interferring with the sagging of the edges of the sheet toward the bed in the curvature transition zone. Furthermore, the conveying means must be such that it has minimal contact with the glass sheet so that the entire glass sheet may be evenly heated, i.e., ideally, the conveying means should not conduct any heat to or from the glass sheet.

In the aforementioned Patent 3,332,759 the conveyor disclosed comprises a chain carrying spaced pivotally mounted pads which engage an edge of the sheet of glass as it is floated on the blanket of gas above the bed, the movement of the chain thereby moving the sheet of glass along the bed by reason of the frictional contact between the pads and the sheet. The frictional contact is sustained due to the fact that the bed is tilted in the direction of the conveyor so that a component of force due to the weight of the sheet of glass acts against the pads.

As alluded to previously, however, the contour of the upper surface of the bed changes from flat to a fixed degree of transverse curvature along a transition portion of the bed. Regardless of the degree of transverse curvature along the bed, however, there are factors which limit the angle to which the bed can be tilted. For example, if the angle of tilt is too small, the component of force acting against the pads will be insufficient to provide the necessary frictional contact to move the sheet of glass along the bed at a constant speed and may even cause the sheet of glass to slip off the pads. On the other hand, if the angle of tilt is too great, the component of force acting against the pads could cause undesirable distortion of the glass at or adjacent the edge abutting the pads. It will be manifest, therefore, that it is highly desirable, if not essential, to utilize a tile angle which provides the optimum amout of frictional contact between the glass sheet and the pads and that this optimum frictional contact be maintained during the travel of the sheet from one end to the other end of the bed and at least during that portion of travel whereat the sheet is in a softened condition. The present invention accomplishes this.

Accordingly, it is an object of the present invention to provide a novel conveying means for moving sheets of material on a blanket of gas along a surface, which changes in contour, by minimal required frictional contact between the sheet and the conveyor means.

Another object of the present invention is to provide a conveying means to be utilized in a furnace wherein sheets of glass are passed along on a blanket of hot gases over a bed having a changing contour for heat treatment and curving thereof whereby the conveying means moves a glass sheet by frictional contact with one edge thereof with optimum assurance against distortion or wrinkling of the glass sheet.

More specifically, it is an object of the present invention to provide a conveying means for a furnace in which a glass sheet is moved on a blanket of gas along a bed having a changing degree of transverse curvature by frictional contact therewith and maintaining the degree of frictional contact between the conveying means and the glass sheet substantially constant regardless of the degree of transverse curvature.

Other objects and attendant advantages of this invention will be readily appreciated as the same becomes better understood by reference to the following detailed description when considered in connection with the accompanying drawings wherein:

FIGURE 2 is a schematic side view of the bed of the furnace of FIGURE 1 and shows the changing degree of transverse curvature;

FIGURE 3 is a cross-sectional view of the bed of FIGURE 1 along the flat portion of the bed;

FIGURE 4 is a cross-sectional view of the bed of FIGURE 1 along the transition portion where the curvature is changing; and FIGURE 5 is an enlarged partial cross-sectional view of the bed of FIGURE 1 along a curved portion and shows the relative disposition between the bed and the conveyor.

Figure 1:
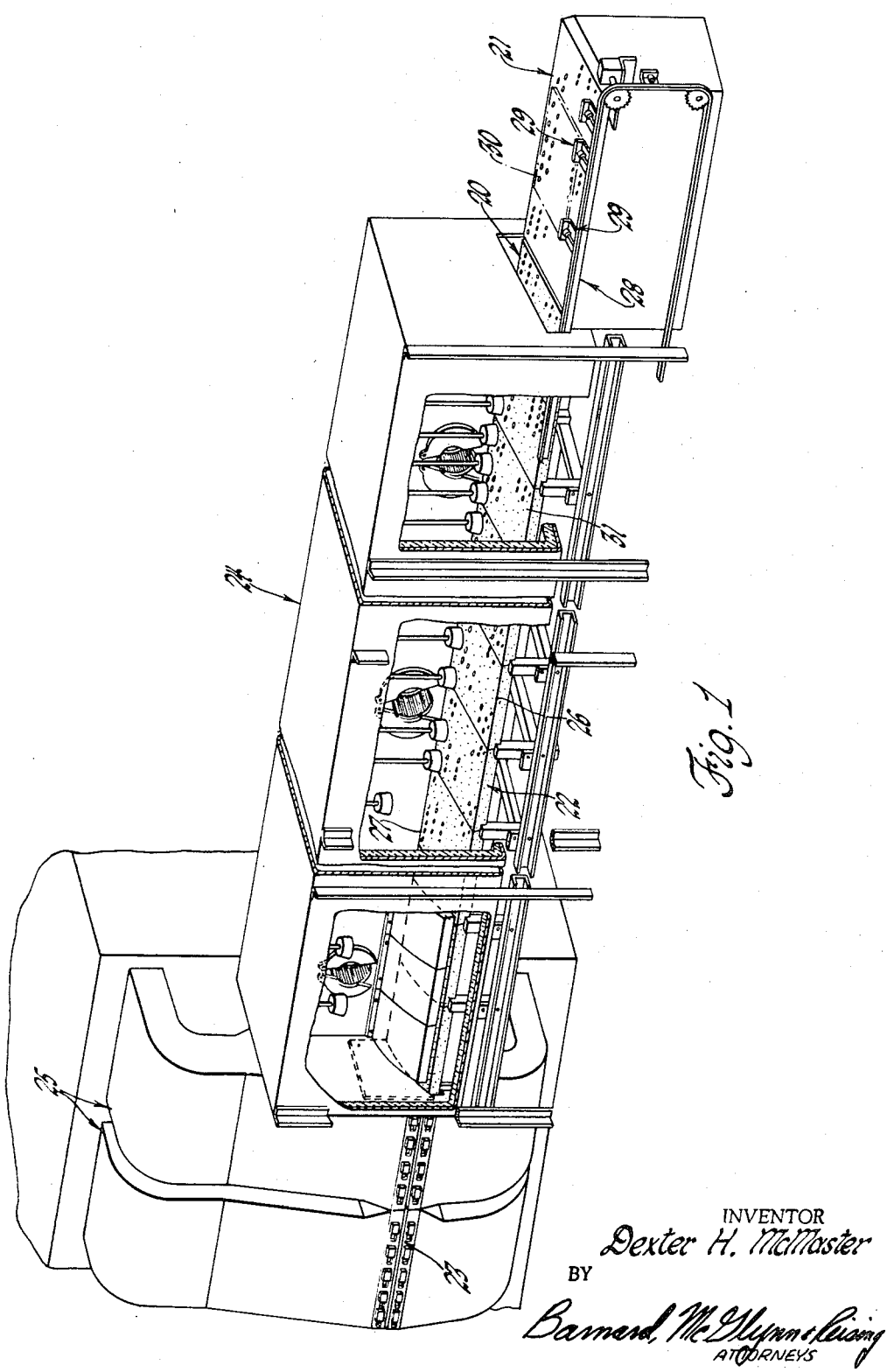
FIGURE 1 is an isometric view, with parts broken away and partially schematic, of the preferred apparatus and illustrates the bed configuration into and through the heating furnace wherein the glass sheets are curved, and into and through the blasthead wherein the curved glass sheets are tempered.

Referring now to FIGURE 1, the apparatus shown comprises an elongated perforated bed, illustrated generally by the numeral 20, which in the actual embodiment herein shown is composed of three main sections comprised of a plurality of blocks 31. These sections include a loading section 21, a heating and bending section 22, and a tempering section 23. The heating and bending section 22 is within and constitutes the floor of an elongated furnace structure, illustrated generally by the numeral 24, and the tempering section 23 extends through a cooling blasthead, illustrated generally by the numeral 25.

The bed is flat throughout section 21 and most of section 22. Approximately two-thirds of the way through section 22 is the transition zone wherein the bed gradually becomes convexly curved in a direction transverse to the longitudinal axis of the bed. Bed section 23, within the blasthead 25, and a portion of section 22 toward the end of the furnace adjacent the blasthead have a uniform transverse cylindrical curvature the same as that desired of the glass sheets to be manufactured. The plane of the bed is tilted so as to form an angle with the horizontal, and hence the left longitudinal edge of the bed, as shown at 26, is lower than the right edge 27, the significance of which will be more clearly set forth hereinafter.

A chain conveyor, illustrated generally by the numeral 28, carrying spaced pairs of glass sheets support pads 29, serves to move the respective glass sheets 30 over the bed 20 from the loading section 21 through the furnace 24 and through the blasthead 25. Gas emitted from perforations in the bed 20 provide a film cushion or blanket of gas on the bed for flotation of the glass sheets thereover in a manner more particularly set forth and described in the aforesaid United States Patent 3,332,759.

In essence, then, and without attention to details as disclosed in the aforesaid patent, which details are incorporated herein by reference, the apparatus operates as follows: the glass sheets 30 to be curved and tempered are placed onto the bed at loading station 21 with the bottom edges of each sheet resting on a pair of floating pads 29 secured to the conveyor 28. The glass sheets are conveyed by the chain and float over the bed out of contact therewith by reason of the gas emitted from the perforations in the bed. The floating glass sheets are thus guided through the furnace 24 where they are heated to deformation temperature by the hot gases emitted from the bed perforations, and as they reach and pass over the transition zone of section 22, the sheets sag under gravity to conform to the curvature thereof, all the while supported on gas out of contact with the bed. Hence, when the sheets reach the end of the furnace, they are shaped to the full curvature desired. Transportation of the floating heated curved glass sheets then continues through the blasthead 25 where they are tempered by the cooling air projected from the bed perforations in the blasthead.

Referring now to FIGURE 2, there is disclosed an illustrative schematic view of the bed, generally shown at 20. Portion 31a illustrates that portion of the bed comprised of blocks 31 having a flat upper surface. Portion 31c, comprised of blocks 31 each having an increasing degree of transverse curvature, represents the transition portion of the bed wherein the contour of the upper surface of the bed changes from flat to a predetermined transverse degree of curvature. Portion 31b is the third portion of the bed comprised of blocks 31 having a degree of transverse curvature therealong which is constant. The overall geometric configuration of the bed, utilized in a furnace of the type involved with the present invention, is more particularly pointed out and claimed in the United States Patent 3,291,590 in the name of Harold A. McMaster and assigned to the assignee of the present invention. The bed illustrated in FIGURE 2 is not shown in the tilted position, but rather is a side view of the bed and, as such, shows that the highest point of curvature along the bed forms a line 223 along the longitudinal median of the bed. In other words, the thickness of the bed along the longitudinal median is constant regardless of the degree of curvature.

There is shown in FIGURE 3 a cross-sectional view of the flat surface portion of the bed, in other words, a cross-section of the portion of the bed illustrated by 31a of FIGURE 2. A conveyor track 101 is shown supporting a chain conveyor 102 and a pad 29. A sheet of glass 30 is shown floating on a blanket of gas above the flat upper surface of portion 31a and resting against the pad 29, which is pivotally connected at 32 to the rod 33; the rod being attached to the conveyor chain 102. As alluded to previously, the pad 29 floats on a blanket of gas and moves the sheet of glass 30 along the bed due to frictional contact between the glass sheet 30 and the pad 29. The frictional contact is caused by a force urging the glass sheet 30 against the pad 29, which force is a result of the tilt of the bed. The bed is tilted about an axis thereof by an angle $\theta$. Accordingly, as is illustrated by the force vector diagram, a force vector W, resulting from the weight of the glass sheet 30, acts vertically downward from the center of mass of the glass sheet. Such a force vector W has a component $F_1$, which acts perpendicular to the flat glass sheet 30 at the middle thereof and in a downward direction, and a component $F_2$, which acts along the plane of the glass sheet 30. It is this force vector $F_2$ which urges the sheet of plate glass 30 against the pad 29 to thereby provide sufficient frictional contact between the glass sheet 30 and the pad 29 so that the glass sheet is moved along the bed as it floats thereabove.

The degrees of tilt of the bed $\theta$, and consequently the magnitude of the force vector $F_2$, is determined by the amount of force when can be subjected to the edge of the sheet of glass 30 without injuring the glass sheet by creating optical distortions therein or causing wrinking of the edge thereof. On the other hand, the force $F_2$ must be sufficient for the pads 29 to move the glass sheet along the bed on the blanket of gas at a constant speed, i.e., without slippage between the pads 29 and the edge of a sheet of glass. It has been found that at an angle where approximately twenty percent (20%) of the weight of a sheet of glass, which is at deformation temperature, is acting against the pads 29, optical distortions are produced in the glass sheet. Furthermore, at an angle where approximately twenty-five percent (25%) of the weight of the sheet of glass, which is at deformation temperature, is acting against the pads 29, the edges of the sheet begin to wrinkle. On the other hand, it has been found, with a constant speed conveyor, a tilt angle of five degrees, in the case of a plane uncurved sheet of glass, is adequate to provide a sufficient force vector $F_2$ to provide the degree of frictional contact necessary, between the plate of glass 30 and the pads 29, to move a glass sheet along the bed. At five degrees of tilt along the flat portion of the bed, the force $F_2$ is approximately eight and seven-tenths percent (8.7%) of the force W due to the weight of the sheet of glass. The eight and seven-tenths percent (8.7%) value has been found satisfactory for the type furnace shown in FIGURE 1 and disclosed in the aforementioned Patent 3,332,759. In a furnace of this type utilizing a bed having a 24-inch width to treat a sheet of glass 16 inches wide resting against the pads two inches from the edge of the bed, the tilt angles vary between five degrees along the flat portion of the bed to three degrees along the curved portion having the constant degree of curvature in order to maintain the force urging the sheet against the pads at approximately eight and seven-tenths percent (8.7%) of the force due to the weight of the glass sheet.

FIGURE 4 shows a cross-sectional view of a block 31 of the bed along the transition portion wherein the upper contour of the bed is changing from flat to transversely curved. Along the curved section of the bed the chord of the transversely curved upper surface is disposed at an acute angle with or relative to a horizontal plane. The sheet of glass 30 is floating on a blanket of gas above the bed and is sagging to conform to the curvature of the bed. As illustrated in FIGURE 2, the center of the block is of a constant thickness and the curvature of the bed causes the edges of the glass sheets 30 to engage the pads 29 at a lower point, so to speak, than the point of contact along the flat portion of the bed. If the angle $\theta'$ in FIGURE 4 is the same value as the angle $\theta$ in FIGURE 3, the force $F_2$ acting against the pad 29 would be greater than it was along the flat portion 31a due to the curvature of the glass sheet 30. That is to say, with a constant degree of tilt along the bed, the force which acts against the pad 29, due to the weight of the sheet of glass, will increase as the transverse curvature of the bed increases.

As alluded to previously, it has been found optimal to maintain the force $F_2$ at approximately eight and seven-tenth percent (8.7%) of the value of the force W due to the weight of a sheet of glass. In accordance with the present invention, to maintain the force vector $F_2$ acting against the pad 29 at substantially a value of eight and seven-tenths percent (8.7%) of the weight of the glass as the bed curvature changes, the degree of tilt therealong is changed in order to compensate for the change in the degree of transverse curvature of the bed. Since the force vector $F_2$ increases as the degree of curvature increases along the bed, it is necessary to decrease the degree of tilt along the bed. Therefore, the angle $\theta'$, shown in FIGURE 4 will decrease as the degree of transverse curvature increases along the bed so as to maintain a component of force $F_2$ acting against the pad 29, due to the weight of the sheet of glass 30, at a substantially constant value.

As will be readily apparent from FIGURES 3 and 4, the distance the pad 29 is positioned vertically above the bed will vary as the angle of tilt of the bed is varied. To maintain the vertical distance above the bed of the pad 29, it is necessary to vary the vertical height of the conveyor rail 101 above the axis about which the bed is tilted.

FIGURE 5 is a partial enlarged cross-sectional view of the side of the bed adjacent the conveyor rail 101 and shows the relative positioning between the bed and the conveyor rail 101 whereby the vertical distance of the pad 29 above the bed is maintained substantially constant. The bed has a curved upper surface 35 and a plane lower surface 36 which is perpendicular to the sides of the bed, one of which is shown at 34. The tilt of the bed is varied by rotating the bed about the axis formed by the line 42, which is the intersection between side 34 and the lower flat surface 36, in order to establish the desired angle of tilt $\theta''$. The conveyor rail 101 is maintained a constant horizontal distance Z from the edge 42 of the bed, but is disposed a variable vertical distance above the edge 42 along the bed in order to maintain the pad 29 a substantially constant vertical distance Y above the curved surface 35 of the bed. The vertical distance Y is measured from a predetermined point on the conveyor rail 101, such as the top, to the height of one of a series of imaginary points 40 on the curved surface 35 of the bed. The series of spaced imaginary points 40 along the curved surface 35 are utilized to determine the vertical position of the conveyor rail 101. The imaginary points 40 are positioned on the curved surface 35 vertically below a predetermined point on the conveyor; such as, for example, vertically below the pivot 32 of the pad 29. In essence, therefore, the position of an imaginary point 40 on the surface 35 is determined by the distance which the pad 29 extends over the curved surface 35. To maintain the pad 29 a constant vertical distance above the curved surface 35, the vertical distance Y, between a predetermined point on the conveyor rail 101 and the respective imaginary points 40, is maintained constant.

As is apparent from the foregoing description, the present invention is directed to a method and apparatus whereby a sheet of glass may be conveyed on a blanket of gas over a bed, which has a changing degree of transverse curvature, by frictional contact with a conveyor disposed adjacent the bed. This is accomplished by tilting the bed toward the conveyor so that a predetermined force urges the glass sheet toward the conveyor. The force urging the sheet against the conveyor is maintained constant by varying the degree of tilt along the bed to compensate for the changing degree of transverse curvature. Furthermore, in order to maintain the bed at a substantially constant relative disposition with the conveyor, regardless of the degree of transverse curvature, certain points along the bed are maintained at constant vertical and horizontal distances from the conveyor.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. An apparatus for curving sheets of glass comprising: a furnace; an elongated bed disposed within said furnace; said bed having passages therein; said bed having a first portion with a flat upper surface; said bed having a second portion with an upper surface which is curved transversely to the longitudinal axis of said bed and with a constant degree of curvature which does not change therealong; said bed having a third portion which is disposed between and abuts said first and second portions; said third portion having an upper surface which changes from flat adjacent said first portion to a degree of transverse curvature adjacent said second portion which is equal to said constant degree of curvature of said second portion; means in communication with said passages in said bed for supplying hot gases to said passages to provide gases over the upper surface of said bed so that sheets of glass are supported on gases over said upper surface of said bed and are heated to deformation temperature to conform to the upper surface of said bed; conveyor means disposed adjacent said bed and being coextensive therewith for moving sheets of glass over said upper surface and along said bed; said bed being tilted at an angle with a horizontal plane so that the chord of the curved upper surface of said bed is disposed at an acute angle with a horizontal plane whereby a component of force, resulting from the weight of a sheet of glass, urges the sheet of glass against said conveyor means for providing sufficient frictional contact between the sheet of glass and said conveyor means to move the sheet of glass along said bed as the sheet is supported on gases; said angle of tilt being a first predetermined angle which remains constant along said first portion of said bed; said angle of tilt being a second predetermined angle which remains constant along said second portion of said bed; said second predetermined angle being smaller than said first predetermined angle; said angle of tilt of said third portion being equal to said first predetermined angle adjacent said first portion and being equal to said second predetermined angle adjacent said second portion; said angle of tilt of said third portion decreases therealong from said first predetermined angle to said second predetermined angle for maintaining said component of force substantially constant as each sheet of glass moves along said bed.

2. Apparatus as set forth in claim 1 wherein said component of force is less than twenty (20) percent of the force due to the weight of a respective sheet of glass.

3. An apparatus as set forth in claim 1 wherein said first constant angle along said first portion of said bed equals approximately five (5) degrees, said angle along said third portion varies between approximately five (5) and three (3) degrees, and said second constant angle along said second portion of said bed equals approximately three (3) degrees.

4. An apparatus as set forth in claim 1 wherein the vertical distance between the axis about which the bed is tilted and said conveyor means varies therealong to compensate for the various angles of tilt to maintain a substantially constant relative disposition between predetermined points on said surface of said bed and said conveyor.

5. An apparatus as set forth in claim 1 wherein said bed has a constant width with parallel sides therealong; said bed has a lower surface therealong which is a plane surface extending between said sides; said bed has a first series of imaginary points at predetermined spaced distances along the upper surface thereof, which points are disposed in a constant horizontal relationship with a predetermined position on said conveyor means and at a constant vertical distance from a second predetermined position on said conveyor means; and bed having a second series of imaginary points lying along the line of intersection of said lower surface and said first side; and said second series of imaginary points each being a constant horizontal distance from said conveyor means.

6. A method of curving sheets of glass as the sheets move through a furnace comprising the steps of: supporting a sheet of glass on gases over the upper surface of an elongated bed having a curvature transverse to its longitudinal axis which increases in degree along at least a portion thereof and which is tilted at an angle with a horizontal plane; frictionally contacting the lower edge of the sheet of glass with a conveying means as the sheet is tilted at an angle to the horizontal and vertical so that the sheet is urged against the conveying means by the component of force resulting from the weight of the sheet and caused by the tilting thereof; moving the sheet of glass along the bed with the conveying means as the sheet is supported on the gases; heating the sheet of glass to deformation temperature as it moves along the bed so that the sheet conforms to the upper surface at the bed; and decreasing the angle of tilt relative to the horizonal plane as the sheet moves over the portion of the bed having the transverse curvature which increases therealong.

References Cited
UNITED STATES PATENTS 3,223,501    12/1965    Fredley et al. _____ 65—25

S. LEON BASHORE, *Acting Primary Examiner.*

A. D. KELLOGG, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,036            September 17, 1968

Dexter H. McMaster

It is certified that error appears in the above identified patent and that said Letters Patent are hereby corrected as shown below:

Column 1, line 65, "in" should read -- is --. Column 2, line 31, "tile" should read -- tilt --; line 32, "amout" should read -- amount --; line 42, "conveyor" should read -- conveying --. Column 4, line 44, "when" should read -- which --; line 46, "wrinking" should read -- wrinkling --. Column 7, line 26, "and" should read -- said --.

Signed and sealed this 3rd day of February 1970.

(SEAL)
Attest:

Edward M. Fletcher, Jr.
Attesting Officer

WILLIAM E. SCHUYLER, JR.
Commissioner of Patents